(12) United States Patent
Stokkeland (10) Patent No.: US 7,404,370 B2
(45) Date of Patent: Jul. 29, 2008

(54) STEERABLE DIVERTER FOR TOWED SEISMIC STREAMER ARRAYS

(75) Inventor: Jan Erik Stokkeland, Heggedal (NO)

(73) Assignee: PGS Norway Geophysical AS, Lysaker (NO)

( * ) Notice: Subject to any disclaimer, the term of this patent is extended or adjusted under 35 U.S.C. 154(b) by 10 days.

(21) Appl. No.: 11/497,973

(22) Filed: Aug. 2, 2006

(65) Prior Publication Data

US 2008/0029012 A1  Feb. 7, 2008

(51) Int. Cl.
 *B63B 21/56* (2006.01)
(52) U.S. Cl. .................. 114/253; 114/246; 114/244
(58) Field of Classification Search ......... 114/244–246, 114/253; 367/16, 17
See application file for complete search history.

(56) References Cited

U.S. PATENT DOCUMENTS

| 4,574,723 A | * | 3/1986 | Chiles et al. ................ 114/253 |
| 4,890,568 A | * | 1/1990 | Dolengowski .............. 114/246 |
| 6,504,792 B2 | * | 1/2003 | Barker ........................ 367/20 |

FOREIGN PATENT DOCUMENTS

| EP | 0 168 959 | 1/1986 |
| GB | 2 332 660 | 6/1999 |
| GB | 2 399 883 | 9/2004 |
| GB | 2 424 217 | 9/2006 |
| WO | WO 98/25162 | 6/1998 |
| WO | WO 02/30737 | 4/2002 |
| WO | WO 02/47968 | 6/2002 |

OTHER PUBLICATIONS

Goett, Harry J. Bullivant, W. Kenneth, "Tests of NACA 0009, 0012, and 0018 Airfoils in the Full-Scale Tunnel", National Advisory Committee for Aeronautics, 1939, pp. 97-106, Report No. 647.
UK Intellectual Property Office, Examiner Stephen Jennings, Search Report, Nov. 8, 2007.

* cited by examiner

*Primary Examiner*—Ed Swinehart
(74) *Attorney, Agent, or Firm*—E. Eugene Thigpen; Richard A. Fagin (57) ABSTRACT

A paravane for a marine seismic survey system includes a float and at least one diverter operatively coupled to the float. The diverter is configured to redirect flow of water past the paravane with respect to a direction of motion of the paravane through water. The paravane also includes a steering device. The steering device is configured to controllably redirect the flow of water so as to control an amount of lateral force generated by the paravane.

26 Claims, 5 Drawing Sheets

STEERABLE DIVERTER FOR TOWED SEISMIC STREAMER ARRAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey systems. More particularly, the invention relates to paravanes used to exert controllable lateral force on a seismic streamer array.

2. Background Art

Marine seismic survey systems are used to acquire seismic data from Earth formations below the bottom of a body of water, such as a lake or the ocean. Marine seismic survey systems known in the art typically include a seismic vessel having onboard navigation, seismic energy source control, and data recording equipment. The seismic vessel is typically configured to tow one or more sensor streamers through the water. At selected times, the seismic energy source control equipment causes one or more seismic energy sources, which may be towed in the water by the seismic vessel or by another vessel, to actuate. Signals produced by various sensors in the one or more streamers in response to energy from the seismic source are conducted to the recording equipment, where a record with respect to time is made of the signals produced by each sensor (or groups of such sensors). The recorded signals are later interpreted to infer the structure and composition of the Earth formations below the bottom of the body of water.

The one or more streamers are in the most general sense long cables that have seismic sensors disposed at spaced apart positions along the length of the cable. A typical streamer can extend behind the seismic vessel for several kilometers. Because of the great length of the typical streamer, movement in the water produces a great deal of drag (friction). More recently, marine seismic acquisition systems have been designed that include a number of such streamers towed by the seismic vessel parallel to each other. A typical multiple streamer system includes a plurality of "lead in cables" each extending from the vessel and coupled to a forward end of one of the streamers.

The streamers are fixed near their forward ends to a spreader cable or "super wide" cable. The spreader cable extends in the water transversely to the direction of motion of the vessel, and when maintained in the correct tension, substantially fixes the relative lateral positions of the forward ends of the streamers. Typically the spreader cable is maintained in tension by a device coupled to each end of the spreader cable called a paravane.

The paravanes include diverters or similar suitably-shaped deflecting plates that redirect the motion of the water past the paravane laterally to produce some amount of lateral force that is applied to the spreader cable. The lateral force exerted by the paravanes is related to the shape and orientation of the deflecting plates and the speed of motion of the paravanes through the water. One issue of concern to seismic survey system operators using paravanes known in the art is that the lateral force exerted by the outermost paravane when the vessel turns can be excessive at ordinary towing speeds because the outermost paravane will be moving considerably faster than the vessel, depending on the lateral distance between such paravane and the centerline of the vessel. Thus, using paravanes known in the art, it is frequently necessary to limit the vessel speed during turns, thus reducing the efficiency with which a survey can be performed. Where there are water currents that move in a direction along the direction of motion of the seismic vessel, the amount of lateral force exerted by paravanes known in the art will increase with current flow opposite the vessel direction because of the increased water velocity past the paravane, or will decrease with water current flow in the same direction as the seismic vessel motion because of decreased water velocity past the paravane. Where there are water currents moving transversely to the direction of motion of the seismic vessel, the seismic streamer array may be moved laterally in a manner that is difficult for the system operator to compensate or control.

It is also known in the art that the most suitable configuration for the array of cables that ultimately couples the paravanes to the spreader cable (called a "bridle") may vary depending on the particular paravane used, and on actual vessel motion conditions. In the event the bridle actually used in any survey is not optimal for the existing equipment configuration and survey conditions, it is frequently necessary to retrieve the paravane and reconfigure the bridle. Such retrieval and reconfiguration operations can be costly and time consuming.

There continues to be a need for improved structures for paravanes and bridles to increase seismic survey efficiency.

SUMMARY OF THE INVENTION

One aspect of the invention is a marine seismic survey system. A system according to this aspect of the invention includes a seismic vessel, a plurality of seismic sensor streamers towed by the vessel at laterally spaced apart positions and a spreader cable extending substantially transversely to a direction of motion of the seismic vessel. Each of the streamers is coupled at its forward end to the spreader cable. A paravane is coupled to each end of the spreader cable. Each paravane includes a float and at least one diverter operatively coupled to the float. The diverter is configured to redirect flow of water past the paravane with respect to a direction of motion of the paravane through water. Each paravane also includes a steering device associated with the paravane. The steering device is configured to controllably redirect the flow of water so as to control an amount of lateral force generated by the paravane. The system includes a tow rope coupled to each paravane at one end and at the other end functionally coupled to the vessel.

Another aspect of the invention is a paravane for a marine seismic survey system. Such a paravane includes a float and at least one diverter operatively coupled to the float. The diverter is configured to redirect flow of water past the paravane with respect to a direction of motion of the paravane through water. The paravane also include a steering device. The steering device is configured to controllably redirect the flow of water so as to control an amount of lateral force generated by the paravane.

Still another aspect of the invention is a method for operating a seismic acquisition system. A method according to this aspect of the invention includes towing a plurality of laterally spaced apart seismic sensor streamers through a body of water. The streamers are coupled at their forward ends to a spreader cable. The spreader cable is disposed between two paravanes, one such paravane located at each end of the spreader cable. The method includes steering at least one of the paravanes to affect a tension on a tow rope coupled to the paravane, and the tension on the spreader cable.

Other aspects and advantages of the invention will be apparent from the following description and the appended claims.

DETAILED DESCRIPTION

Figure 1:
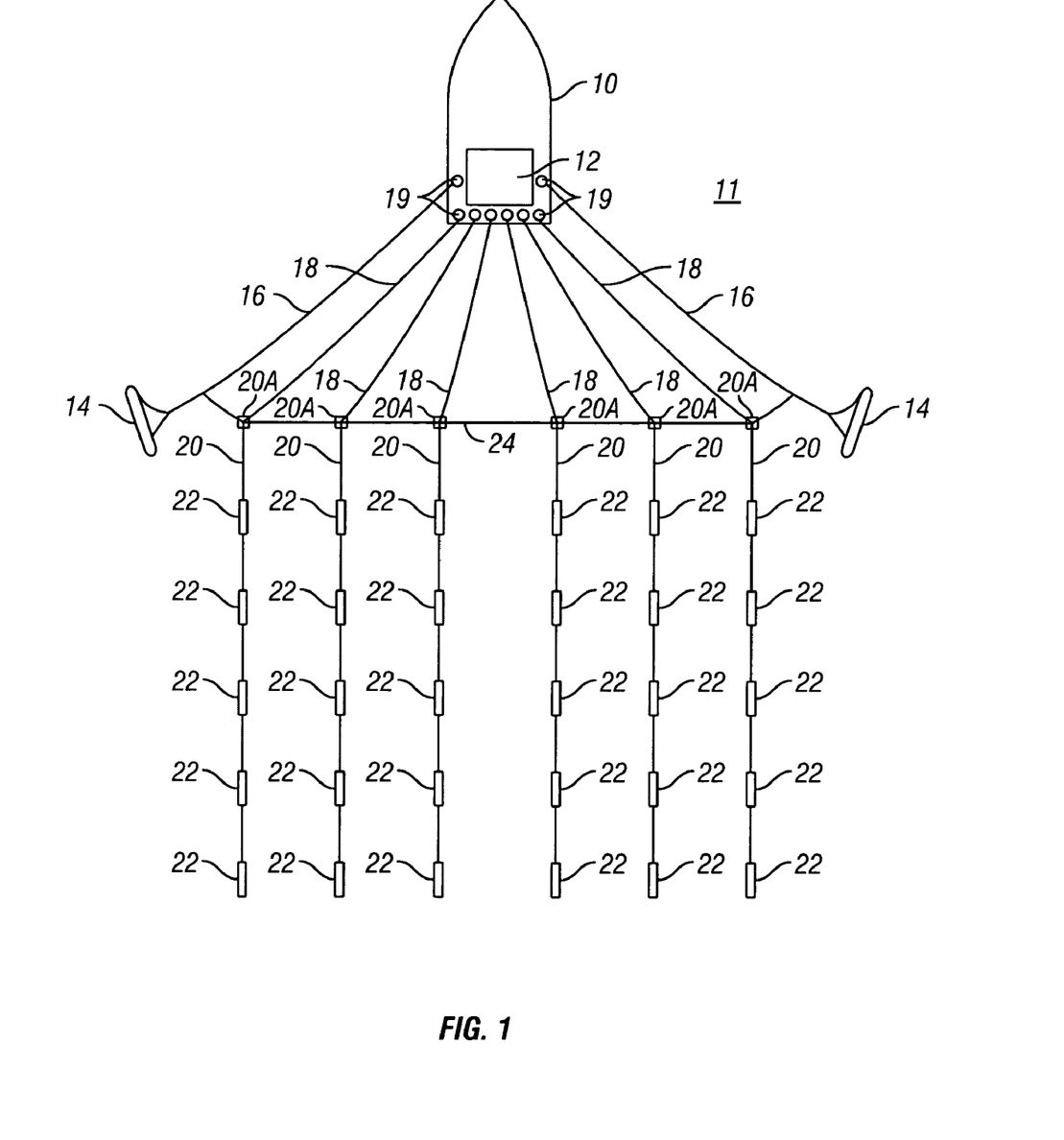
FIG. 1 shows a plan view of a typical marine seismic survey system that can include steerable paravane according to the invention.

FIG. 1 shows a typical marine seismic survey system that can include paravanes and/or paravane connecting bridles according to the various aspects of the present invention. FIG. 1 shows a seismic vessel 10 that moves along the surface of a body of water 11 such as a lake or the ocean. The seismic vessel 10 may include thereon certain electronic equipment, shown at 12 and for convenience collectively called a "recording system." The recording system 12 typically includes a recording unit for making a record with respect to time of signals detected by various seismic sensors in the survey system. The recording system 12 also typically includes navigation equipment to determine at any time the position of the vessel 10 and each of a plurality of seismic sensors 22 disposed at spaced apart locations on streamers 20 towed by the vessel 10. The foregoing elements of the recording system 12 are familiar to those skilled in the art and are not shown in the Figures for clarity of the illustration. In the present invention, the recording unit 12 may also include devices for controlling operation of a steering device, as will be further explained below.

The seismic sensors 22 can be any type of seismic sensor known in the art such as motion responsive sensors, acceleration sensors, pressure sensors, pressure time gradient sensors or any combination thereof. The seismic sensors 22 detect seismic energy primarily reflected from various structures in the Earth's subsurface below the bottom of the water 11. The seismic energy originates from a seismic energy source (not shown) deployed in the water 11. The recording system 12 may also include seismic energy source control equipment (not shown separately). One or more seismic energy sources (not shown in the Figures for clarity) may be towed by the seismic vessel 10 or by another vessel (not shown) nearby.

In the seismic data acquisition system shown in FIG. 1, there are six seismic sensor streamers 20 towed by the seismic vessel 10. The number of seismic sensor streamers may be different in any particular implementation of an acquisition system according to the various aspects of the invention, therefore, the number of streamers shown in FIG. 1 is not intended to limit the scope of the invention. As explained in the Background section herein, in seismic acquisition systems such as shown in FIG. 1 that include a plurality of laterally spaced apart streamers, the streamers 20 are coupled to towing equipment that maintains the streamers 20 at selected lateral positions with respect to each other and with respect to the seismic vessel 10. As shown in FIG. 1, the towing equipment can include two paravane tow ropes 16 each coupled to the vessel 10 at one end through a winch 19 or similar spooling device that enables changing the deployed length of each paravane tow rope 16. The other end of each paravane tow rope 16 is functionally coupled to a paravane 14, typically through a set of cables called a "bridle", which will be further explained herein. The paravanes 14 are each configured to provide a lateral force component to the various elements of the seismic survey system deployed in the water 11 when the paravanes 14 are towed in the water 11, as will be explained below. In various aspects of the present invention, such lateral force component can be adjustable or controllable. Lateral in the present description means essentially transverse to the direction of motion of the vessel 10. The lateral force component of each paravane 14 is opposed to that of the other paravane 14, and is generally in a direction outward from the centerline of the vessel 10. The combined lateral force of the paravanes 14 separates the paravanes 14 from each other until they put one or more spreader ropes or cables 24, functionally coupled end to end between the paravanes 14, into tension.

As used in the present description, the term "cable" means a device that includes one or more electrical and/or optical conductors therein for carrying electrical power and/or signals from the vessel 10 to and/or from various components of the seismic acquisition system. A cable as used in the present context may also include various strength members for carrying axial loading along the cable, and thus may be a load bearing part of the survey system. The term "rope" is used in the present description to refer to a flexible, axial load carrying member that does not include any form of electrical and/or optical conductor, and as such is used essentially only to carry axial loading. Such rope may be made from fiber, steel or other high strength metal, or combinations thereof. In typical multiple-streamer acquisition systems, such as shown in FIG. 1, the laterally outermost towing elements, the paravane tow ropes 16 are in fact typically ropes as defined above. However, such configuration is not meant to limit the scope of this invention. Other embodiments within the scope of this invention may provide cables at the laterally outermost towing positions coupled between the paravanes 14 and the seismic vessel 10 as shown in FIG. 1.

The streamers 20 are each coupled, at the axial ends thereof nearest the vessel 10 (forward ends), to a respective lead-in cable termination 20A. The lead-in cable terminations 20A are coupled to or are associated with the spreader ropes or cables 24 so as to control the lateral positions of the streamers 20 with respect to each other and with respect to the vessel 10. Electrical and/or optical connections between the appropriate components in the recording system 12 and the sensors (and/or other circuitry) in the streamers 20 may be made using inner lead-in cables 18, each of which terminates in a respective lead-in cable termination 20A. A lead in termination 20A is disposed at the vessel end of each streamer 20. Corresponding electrical and/or optical connection between the appropriate components of the recording unit 12 and the sensors 22 in the streamers 20 may be made, through respective lead-in terminations 20A, using lead-in cables 18. Each of the lead-in cables 18 and tow ropes 16 may be deployed by a respective winch 19 or similar spooling device such that the deployed length of each cable 18 and tow rope 16 can be changed.

As will be readily appreciated by those skilled in the art, the lateral separation between the streamers 20 is controlled by the tension on the spreader ropes or cables 24. In one aspect of the invention, the paravanes 14 can have adjustable lateral force, such that the tension on the spreader cables 24 can be controlled. The paravanes 14 according to some aspects of the present invention may include a steering device to controllably redirect the flow of water past the paravane, and/or adjust its angle of attack (angle subtended by the longitudinal axis of the paravane with respect to the direction of motion of the vessel 10) to control the amount of lateral force developed thereby. "Steering device" as used herein is intended to mean a device that cooperates with the paravane to perform either or both controllably redirecting the flow of water past the paravane or controllably changing the angle of attack of the paravane. Examples of both types of steering device will be explained below with reference to FIGS. 2 through 6.

Figure 2:
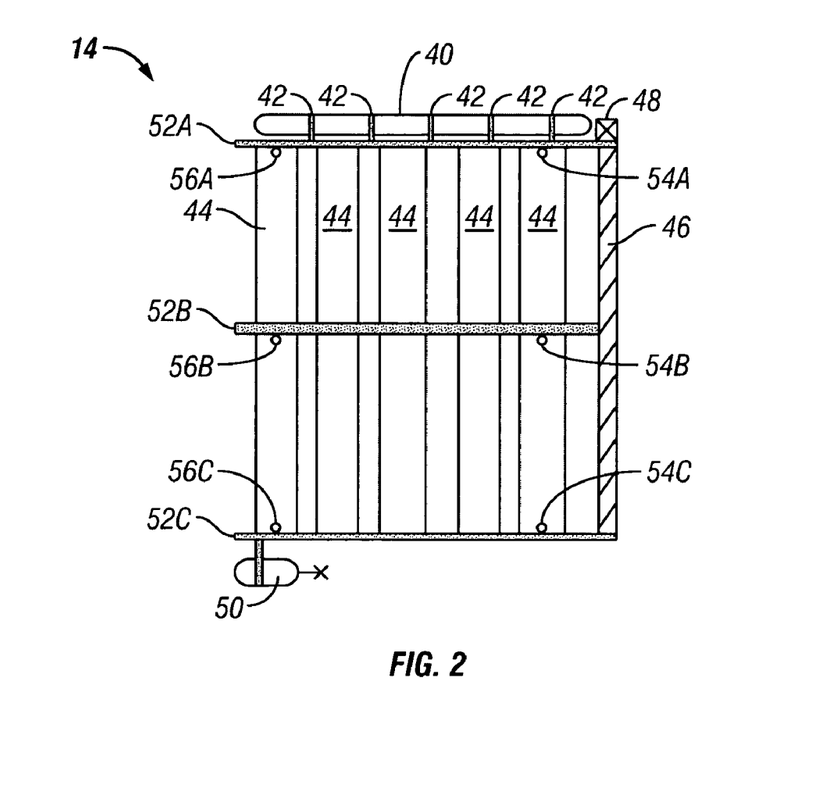
FIG. 2 shows one embodiment of a steerable paravane.

FIG. 2 shows a cross section of one embodiment of a paravane having a steering device according to the invention. The paravane 14 includes several principal components, including a generally longitudinally extending float or buoy 40 that maintains the paravane 14 in a selected position with respect to the water surface and buoyantly supports the remainder of the components of the paravane 14. The float 40 can be coupled, for example, by clamps, brackets or bands 42 to an upper diverter frame 52A. The upper diverter frame 52A provides mounting and support for the uppermost ends of a plurality of substantially vertically extending diverters 44, each of which has a selected shape and orientation with respect to the longitudinal axis of the paravane 14 to redirect movement of water as the paravane 14 is towed by the vessel (10 in FIG. 1). Such redirection of the water movement results in lateral force being generated by the paravane. In the present embodiment, the diverters 44 are supported approximately in their longitudinal center by a center diverter frame 52B, and at their lower longitudinal ends by a lower diverter frame 52C. Collectively, the frames 52A, 52B, 52C maintain the position of and the orientation of the diverters 44 with respect to the float 40. The diverters 44 are rigidly mounted in the frames 52A, 52B, 52C such that the amount of lateral force generated depends essentially entirely on the speed of the paravane 14 through the water.

Each diverter frame 52A, 52B, 52C may include respective forward bridle cable couplings, such couplings shown at 56A, 56B, 56C, and aft bridle cable couplings, such couplings shown at 54A, 54B, 54C. An arrangement of a bridle and associated cables according to another aspect of the invention will be explained below with reference to FIG. 3.

In the present embodiment, a steering device for the paravane 14 includes a rudder 46 rotatably mounted between the upper frame 52A and lower frame 52C. The rudder 46 is operable to change the amount of lateral force exerted by the paravane 14 at any speed of travel through the water by rotating the direction of its plane with respect to the longitudinal axis of the paravane 14. Rotational orientation of the plane of the rudder 46 with respect to the longitudinal axis of the paravane 14 can be controlled by a control unit 48, which will be further explained below with reference to FIG. 4. Electrical power to operate various electronic components (not shown in FIG. 2) in the control unit 48 may be supplied by a turbine-powered generator, shown generally at 50 and affixed to the lower frame 52C. The generator 50 converts flow of the water past the paravane 14 into rotational energy to drive an electric alternator or generator (not shown separately) disposed therein and collectively referred to as a "generator." The exact structure and location on the paravane 14 chosen for the generator 50 are matters of discretion for the designer and are not intended to limit the scope of the invention.

The cross-section of the rudder 46 may be similar to the cross-section of a thin plate, however the cross-section of the rudder 46 may have other shapes known to those of ordinary skill in the art, for example, a profile 0009 airfoil cross section as described in, Goett, Harry J Bullivant, W Kenneth *Tests of NA CA 0009, 0012, and 0018 airfoils in the full-scale tunnel*, Report No. 647, National Advisory Committee for Aeronautics, 1939. By using a profile cross-section such as the foregoing example, the rudder 46 may have additional strength, reduced weight and reduced turbulence in the water as compared to a planar cross-section rudder.

As will be appreciated by those skilled in the art, part of the lateral force produced by the paravane 14 as it moves through the water, as well as the towing force supplied by the vessel (10 in FIG. 1) is coupled between the vessel (10 in FIG. 1) and paravane 14 through the paravane tow rope (16 in FIG. 1). By coupling the tow rope (16 in FIG. 1) to the paravane 14 using a device called a bridle, such forces may be distributed over a substantial portion or all of the cross-sectional area of the paravane structure, rather than being concentrated at a single coupling point. The bridle, one embodiment of which will be further explained below, typically includes a plurality of cables or ropes that each terminate at one end in one of the bridle cable couplings 54A, 54B, 54C and 56A, 56B, 56C, and each terminate at the other end in one or more bridle nodes.

Figure 3:
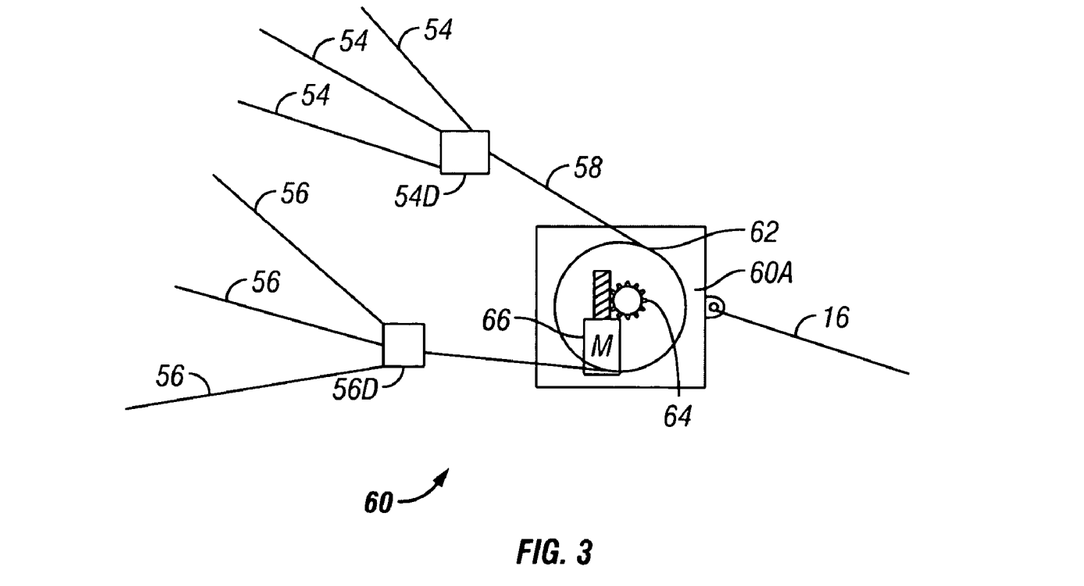
FIG. 3 shows an adjustable position bridle that can be used with the paravane shown in FIG. 2.

For purposes of analyzing forces on the paravane 14 and on the bridle cables, each bridle node acts as a single point. In some embodiments of the invention there are two such bridle nodes in each bridle, a forward node and an aft node. Each such node itself can be functionally coupled to the tow rope (16 in FIG. 1) by a node lead in cable. The length of each node lead in cable in some embodiments can be controlled to maintain properly distributed tension on all the bridle cables, depending on the angle that the paravane subtends with respect to the direction of travel of the vessel (10 in FIG. 1) and on the amount of lateral force exerted by the paravane 14. Referring to FIG. 3, one example of an adjustable length node lead in cable system that may be used with the paravane of FIG. 2 will now be explained. As explained above, bridle cables, shown at 54 for the aft bridle cables and 56 for the forward bridle cables respectively, each couple at one end to a respective coupling (54A, 54B, 54C and 56A, 56B, 56C in FIG. 2) on the paravane diverter frames (52A, 52B, 52C in FIG. 2). Also as explained above, the bridle cables 54 and 56 are coupled at their other ends to a respective bridle node, shown at 54D for the aft node and at 56D for the forward node. The nodes 54D, 56D are each coupled to an end of a node lead in line 58 which may be a cable or chain, as shown in FIG. 3. The particular structure used for the lead in line 58, and the particular device used to control the length of the respective portions of the lead in line 58 are a matter of discretion for the system designer. For purposes of defining the scope of this aspect of the invention, it is only necessary that the length of lead in line 58 between the coupling point to the tow rope 16 and to each of the forward node 56D and the aft node 54D be controllable so as to be able to control the position of the effective coupling point (tow point) between the tow rope 16 and the nodes 54D, 56D.

The effective tow point of the tow rope 16 in the present embodiment can be moved with respect to the paravane in the present embodiment using a node position controller 60. The node position controller 60 in this embodiment includes the node lead in line 58 which can be coupled at each end to one of the nodes 54D, 56D. The lead in line 58 is also wrapped around a sheave or sprocket 62 rotatably mounted within a frame 60A. A sheave is used when the lead in line 58 is in the form of a rope, wire rope or a cable. A sprocket is used when the lead in line 58 is in the form of a chain. The frame 60A is functionally coupled to the distal end of the tow rope 16 and transmits towing force from the tow rope 16 to the sheave or sprocket 62, which then transmits towing force to each end of the lead in line 58, and thus ultimately to each node 54D, 56D. In the present embodiment, the distribution of tow forces on each of the forward bridle cables 56 and aft bridle cables 54 can be changed by changing the distance between each node 54D, 56D and the frame 60A. Such distance change in the present embodiment is effected by rotation of the sheave or sprocket 62, thus changing relative length of each segment of the lead in line 58. Rotation of the sheave or sprocket 62 may be effected by a motor/worm gear combination 66 rotationally coupled to a spur gear 64. The spur gear 64 may be rotationally fixed to the sheave or sprocket 62, such that rotation of the spur gear 64 causes corresponding rotation of the sheave or sprocket 62. The motor in the motor/worm gear combination 66 may be an electric motor or hydraulic motor. Although other arrangements of motor may be used to rotate the sheave or sprocket 62, a motor/worm gear combination is preferred because such combination will substantially prevent tension on the lead in line 58 from affecting the rotational position of the sheave or sprocket 62, thus maintaining the lengths of the forward and aft segments of the lead in line 58 fixed. Operation of the motor in the motor/work gear combination 66 may be performed by selected circuits (not shown) in the control unit (48 in FIG. 2), as will be explained in more detail below with reference to FIG. 4.

Figure 4:
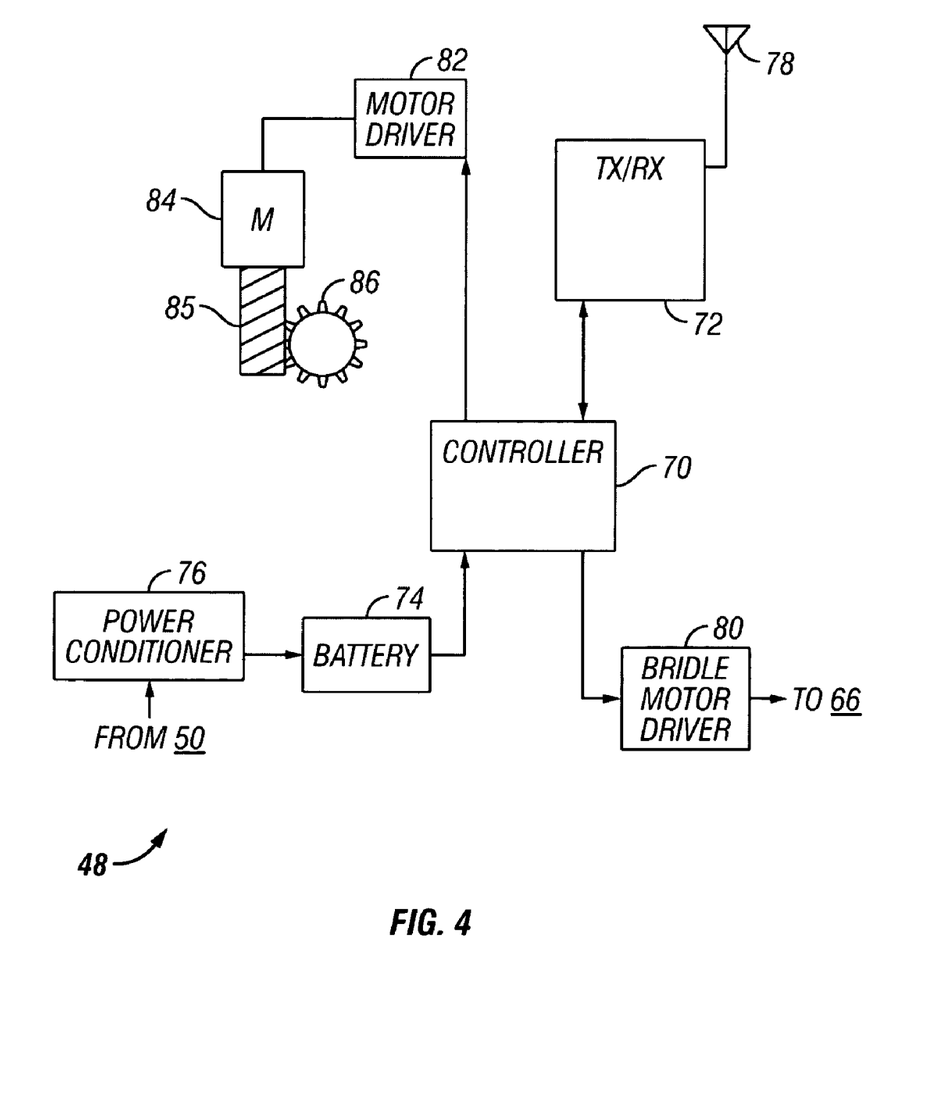
FIG. 4 shows one embodiment of a control unit for the paravane shown in FIG. 2.

FIG. 4 shows one embodiment of the control unit referred to with reference to FIG. 2. The control unit 48 may include all the system components needed to receive and decode signals sent from navigation equipment in the recording unit (12 in FIG. 1), and to use such decoded signals to adjust the amount of lateral force exerted by the paravane (14 in FIG. 2) and the effective coupling point of the bridle to the tow rope (16 in FIG. 1). The present embodiment of the controller 48 may include a telemetry transceiver 72 coupled to an antenna 78. The antenna 78 should be positioned on the float (40 in FIG. 2) such that it is generally not submerged in the water. The transceiver 72 may receive signals sent from the navigation equipment in the recording system (12 in FIG. 1) intended to change either or both of the rudder (46 in FIG. 2) orientation and the position along the bridle lead in line (58 in FIG. 3) of the node position controller (60 in FIG. 3). The signals detected and decoded by the transceiver 72 may be conducted to a controller 70, which may be any microprocessor based controller, programmable logic controller or similar device. The controller 70, upon detecting signals to adjust the orientation of the rudder (46 in FIG. 2), sends appropriate command signals to a first motor driver 82. The first motor driver 82 operates a rudder control motor 84, which may be an electric motor or hydraulic motor. The rudder control motor 84 may be coupled at its output shaft to a worm gear 85. The worm gear 85 may be in contact with a spur gear 86 rotationally coupled to the rudder (46 in FIG. 2) such that rotation of the spur gear 86 causes corresponding rotation of the rudder (46 in FIG. 1). A possible advantage of the motor/worm gear/spur gear arrangement shown in FIG. 4 is that movement of water past the rudder (46 in FIG. 2) will not substantially change the rudder orientation.

A second motor controller 80, which may be similar in configuration to the first motor controller 82, may also receive control signals from the controller 70 to operate the motor (66 in FIG. 3) in the node position controller (60 in FIG. 3).

A battery 74 may provide uninterrupted electrical power to the controller 70 and the other components in the control unit 48. The generator (50 in FIG. 2) may supply electrical power to keep the battery charged during times when the paravane (14 in FIG. 2) is moving through the water. Typically the battery 74 will be electrically coupled to the generator (50 in FIG. 3) through a power conditioner circuit 76 to maintain suitable voltage regulation and to maximize the useful life of the battery 74.

Figure 5:
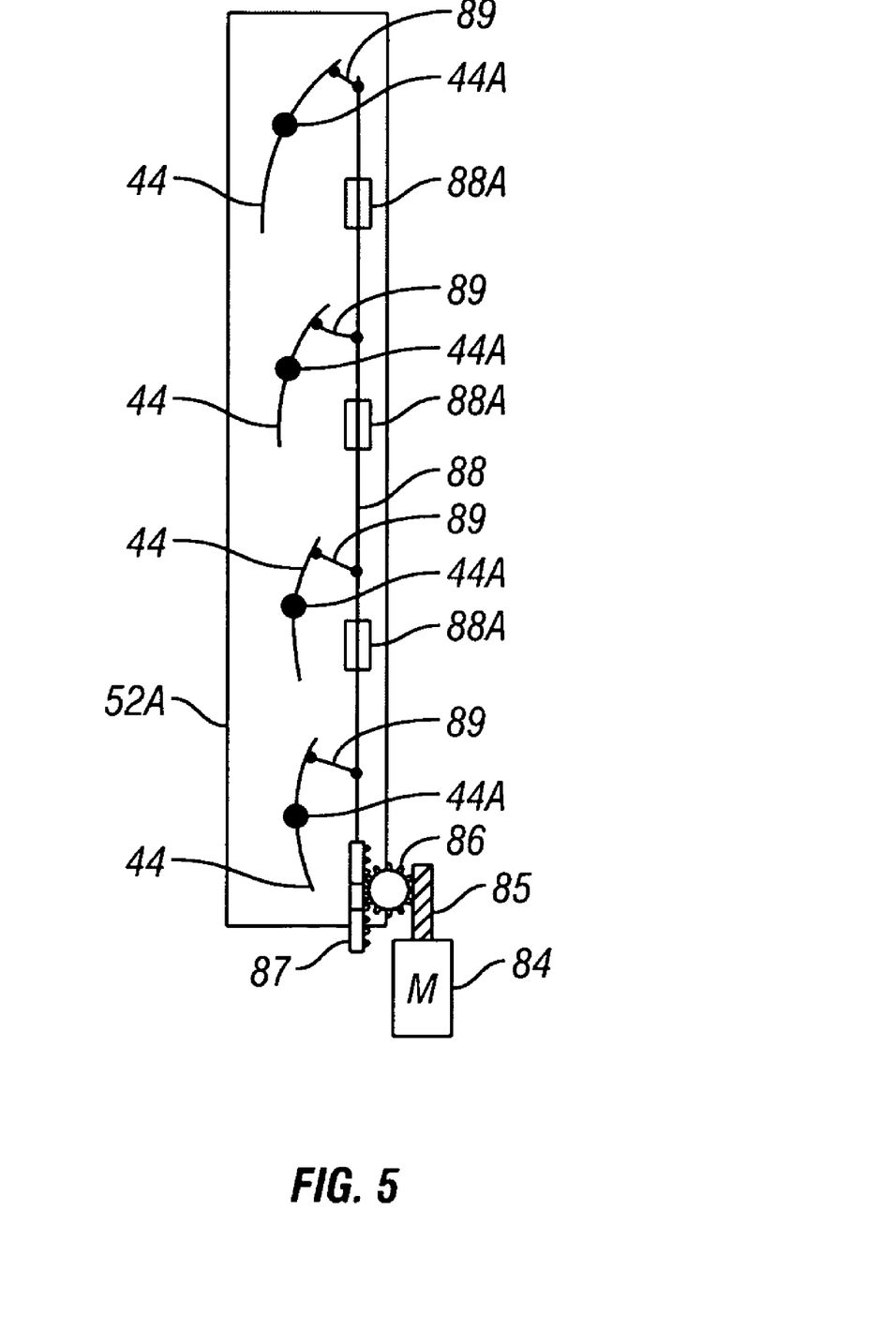
FIG. 5 shows another embodiment of a steering device for a paravane.

Another embodiment of a steering device will be explained with reference to a top view thereof in FIG. 5. The diverters 44 in the embodiment of FIG. 5 are each coupled to the upper (and lower) diverter frames 52A and 52C (shown in FIG. 2) preferably approximately in the rotational center of each diverter 44 by a pivot 44A. Such coupling will enable rotation of the diverters 44 in the frames. Each diverter 44 may be coupled, preferably near a lateral edge thereof to one end of a link 89. Each end of each link 89 preferably includes a pivot or hinge thereon to couple the link 89 to the corresponding diverter 44 at one end and at the other end of the link 89 to a steering rod 88. The steering rod 88 may be constrained to move longitudinally along the upper frame 52A by linear bearings 88A affixed to the upper frame 52A. The steering rod 88 may be caused to move back and forth along the frame 52A by having a rack 87 fixed at some place along the steering rod 88. The rack 87 has teeth shaped to engage a spur gear 86. The spur gear 86 may be similar to that in the embodiment explained with reference to FIG. 4, and may be rotated by a motor 84 and worm gear 85, similar to the motor and worm gear explained with reference to FIG. 4. The motor 84 can be operated by the controller (70 in FIG. 4) and first motor driver (82 in FIG. 4), also as explained with reference to FIG. 4. Thus, operation of the motor 84, ultimately causes linear motion of the steering rod 88. Such motion of the steering rod 88 rotates the diverters 44 with respect to the longitudinal axis of the paravane 14. Such relative rotation changes the amount of lateral force generated by the paravane at any particular speed of motion through the water.

Figure 6:
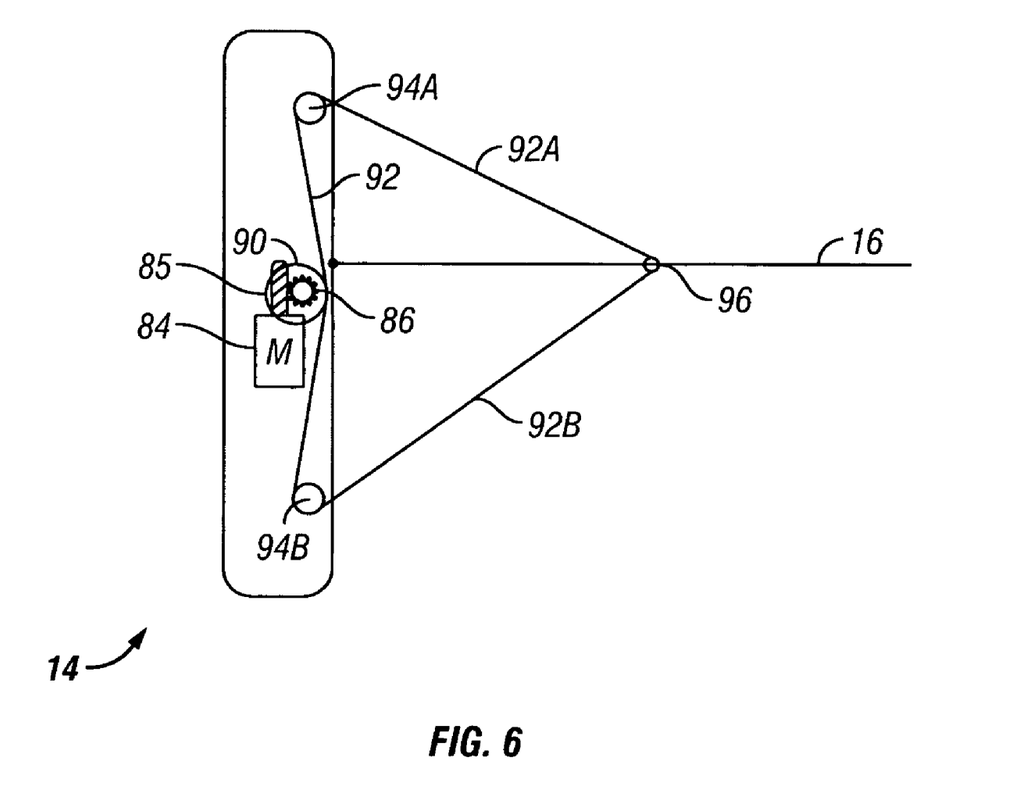
FIG. 6 shows another embodiment of a steering device for a paravane.

Another embodiment of steering device is shown in FIG. 6. The steering device in the present embodiment includes a steering line or wire 92 coupled at its ends to a node 96 along the tow rope 16. The tow rope 16 in the present embodiment can be directly coupled to the paravane 14. The relative lengths of the forward section 92A and aft section 92B of the steering wire 92 may be controlled by operating a motor 84 that is rotationally coupled through a worm gear 85 and spur gear 86 to a sheave 90. The arrangement of worm gear and spur gear as shown in FIG. 6 has the advantage of resisting rotation of the sheave 90 when the motor 84 is stopped, thus maintaining the position of the steering wire 92. The steering wire 92 extends from the sheave 90 through suitably placed forward 94A and aft 94B steering sheaves, such that changing the relative length of the forward 92A and aft 92B steering wire sections will rotate the paravane 14 relative to the tow rope 16 and thus the direction of travel of the seismic vessel (10 in FIG. 1). By rotating the angle of the paravane 14 with respect to the direction of motion of the vessel, the amount of lateral force generated by the paravane can be changed.

Embodiments of a paravane and/or bridle system according to the various aspects of the invention may provide enhanced efficiency during seismic survey operations by enabling selective control over the amount of lateral force exerted by the paravanes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A paravane for a marine seismic survey system, comprising:
   a float;
   at least one diverter operatively coupled to the float, the diverter configured to redirect flow of water past the paravane with respect to a direction of motion of the paravane through water;
   a steering device associated with the paravane, the steering device configured to controllably redirect the flow of water so as to control an amount of lateral force generated by the paravane;
   a bridle having cables coupled at one end thereof to a plurality of spaced apart positions about the cross sectional area of the paravane, part of the positions disposed proximate a front of the paravane, another part of the positions disposed proximate an aft end of the paravane, the front coupled cables coupled at the other ends thereof to a forward node, the aft cables coupled at the other ends thereof to an aft node, the forward node and aft node coupled to opposite ends of a node lead in line; and
   means for adjusting a coupling point of the lead in line to one end of a tow rope, the other end of the tow rope functionally coupled to a tow vessel, the coupling point adjustable between the two ends of the lead in line.

2. The paravane of claim 1 wherein the steering device comprises a rudder.

3. The paravane of claim 2 further comprising means to controllably rotate the rudder with respect to a longitudinal axis of the paravane.

4. The paravane of claim 3 wherein the means for rotating comprises a motor rotationally coupled to the rudder.

5. The paravane of claim 4 wherein the motor is rotationally coupled to the rudder through a worm gear.

6. The paravane of claim 1 wherein the steering device comprises a steering linkage operatively coupled to the at least one diverter and configured to rotate the diverter with respect to a longitudinal axis of the paravane.

7. The paravane of claim 6 wherein the steering linkage includes a steering rod configured to move a longitudinal axis of the paravane.

8. The paravane of claim 7 wherein the steering linkage comprises a motor coupled through a worm gear and a sector to the steering rod.

9. The paravane of claim 1 wherein the means for adjusting coupling point comprises a steering wire coupled at its ends to a tow rope, the tow rope being functionally coupled to the towing vessel, the steering wire coupled to a forward position and an aft position along the paravane, a length of the steering wire between the forward position and the tow rope and the aft position and the tow rope being controllable to affect an angle subtended between the paravane and a direction of motion of the towing vessel.

10. The paravane of claim 9 further comprising a motor rotationally coupled to a sheave, wherein rotation of the sheave changes a length of the steering wire between the forward position and the tow rope and the aft position and the tow rope.

11. The paravane of claim 1 further comprising a transceiver for detecting signals from a navigation device, a controller in operative communication with the transceiver and a motor in operative communication with the controller, the controller configured to operate the motor in response to the detected signals, an output of the motor functionally coupled to the steering device to move the steering device in response to the detected signals.

12. The paravane of claim 11 further comprising a turbine operated electric generator operatively coupled to the paravane, the turbine arranged to convert motion of water past the paravane into rotational energy to drive the generator, an electrical output of the generator operatively coupled to the transceiver, to the motor and to the controller.

13. The paravane of claim 1 wherein the means for adjusting comprises a motor, and at least one of a sheave and a sprocket rotatably supported in a frame and rotationally coupled to the motor, the frame operatively connected to the end of the tow rope, the at least one of a sheave and a sprocket in contact with the lead in line such that operation of the motor turns the at least one of a sheave and sprocket, thereby moving the lead in line with respect to the frame.

14. A marine seismic survey system, comprising:
    a seismic vessel;
    a plurality of seismic sensor streamers towed by the vessel at laterally spaced apart positions;
    a spreader cable extending substantially transversely to a direction of motion of the seismic vessel, each of the streamers coupled at its forward end to the spreader cable;
    a paravane coupled to each end of the spreader cable, each paravane including a float; each paravane including at least one diverter operatively coupled to the float, the diverter configured to redirect flow of water past the paravane with respect to a direction of motion of the paravane through water; each paravane including a steering device associated with the paravane, the steering device configured to controllably redirect the flow of water so as to control an amount of lateral force generated by the paravane;
    a tow rope coupled to each paravane at one end and at the other end functionally coupled to the vessels;
    a bridle having cables coupled at one end thereof to a plurality of spaced apart positions about the cross sectional area of the paravane, part of the positions disposed generally at a front of the paravane, another part of the positions disposed generally at an aft of the paravane, the front coupled cables coupled at the other ends thereof to a forward node, the aft cables coupled at the other ends thereof to an aft node, the forward node and aft node coupled to opposite ends of a node lead in line; and
    means for adjusting a coupling point of the lead in line to one end of the tow rope, the coupling point adjustable between the two ends of the lead in line.

15. The system of claim 14 wherein the steering device comprises a rudder.

16. The system of claim 15 further comprising means to controllably rotate the rudder with respect to a longitudinal axis of the paravane.

17. The system of claim 16 wherein the means for rotating comprises a motor rotationally coupled to the rudder.

18. The system of claim 17 wherein the motor is rotationally coupled to the rudder through a worm gear.

19. The system of claim 14 wherein the steering device comprises a steering linkage operatively coupled to the at least one diverter and configured to rotate the diverter with respect to a longitudinal axis of the paravane.

20. The system of claim 19 wherein the steering linkage includes a steering rod configured to move a longitudinal axis of the paravane.

21. The system of claim 20 wherein the steering linkage comprises a motor coupled through a worm gear and a sector to the steering rod.

22. The system of claim 14 wherein the means for adjusting comprises a steering wire coupled at its ends to the tow rope, the steering wire coupled to a forward position and an aft position along the paravane, a length of the steering wire between the forward position and the tow rope and the aft position and the tow rope being controllable to affect an angle subtended between the paravane and a direction of motion of the towing vessel.

23. The system of claim 22 further comprising a motor rotationally coupled to a sheave, wherein rotation of the sheave changes a length of the steering wire between the forward position and the tow rope and the aft position and the tow rope.

24. The system of claim 14 further comprising a transceiver for detecting signals from a navigation device, a controller in operative communication with the receiver and a motor in operative communication with the controller, the controller configured to operate the motor in response to the detected signals, an output of the motor functionally coupled to the steering device to move the steering device in response to the detected signals.

25. The system of claim 24 further comprising a turbine operated electric generator operatively coupled to the paravane, the turbine arranged to convert motion of water past the paravane into rotational energy to drive the generator, an electrical output of the generator operatively coupled to the transceiver, to the motor and to the controller.

26. The system of claim 14 wherein the means for adjusting comprises a motor, and at least one of a sheave and a sprocket rotatable supported in a frame and rotationally coupled to the motor, the frame operatively connected to the end of the tow rope, the at least one of a sheave and a sprocket in contact with the lead in line such that operation of the motor turns the at least one of a sheave and sprocket, thereby moving the lead in line with respect to the frame.

* * * * *

UNITED STATES PATENT AND TRADEMARK OFFICE
CERTIFICATE OF CORRECTION

| | | |
|---|---|---|
| PATENT NO. | : 7,404,370 B2 | Page 1 of 1 |
| APPLICATION NO. | : 11/497973 | |
| DATED | : July 29, 2008 | |
| INVENTOR(S) | : Jan Erik Stokkeland and Ole-Fredrik Semb | |

It is certified that error appears in the above-identified patent and that said Letters Patent is hereby corrected as shown below:

Title page, Item (75), the second inventor's name should be added --Ole-Fredrik Semb--

Signed and Sealed this

Thirteenth Day of October, 2009

David J. Kappos
*Director of the United States Patent and Trademark Office*